United States Patent
Chelstrom et al.

(10) Patent No.: US 7,702,944 B2
(45) Date of Patent: *Apr. 20, 2010

(54) DYNAMIC FREQUENCY SCALING SEQUENCE FOR MULTI-GIGAHERTZ MICROPROCESSORS

(75) Inventors: Nathan Chelstrom, Cedar Park, TX (US); Mack Wayne Riley, Austin, TX (US); Michael Fan Wang, Austin, TX (US); Stephen Douglas Weitzel, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/352,108

(22) Filed: Jan. 12, 2009

(65) Prior Publication Data

US 2009/0119552 A1  May 7, 2009

Related U.S. Application Data

(63) Continuation of application No. 10/937,689, filed on Sep. 9, 2004, now Pat. No. 7,516,350.

(51) Int. Cl.
*G06F 1/00* (2006.01)
*H03L 7/00* (2006.01)
(52) U.S. Cl. .......................... 713/500; 713/501; 327/145
(58) Field of Classification Search .................. 713/500
See application file for complete search history.

(56) References Cited

U.S. PATENT DOCUMENTS

| | | | |
|---|---|---|---|
| 4,973,860 A | 11/1990 | Ludwig | |
| 5,086,236 A | 2/1992 | Feemster | |
| 5,291,529 A | 3/1994 | Crook et al. | |
| 5,654,988 A | 8/1997 | Heyward et al. | |
| 6,211,740 B1 | 4/2001 | Dai et al. | |
| 6,762,629 B2 | 7/2004 | Tam et al. | |
| 6,822,495 B2 * | 11/2004 | Larsson et al. | 327/211 |

* cited by examiner

*Primary Examiner*—Suresh K Suryawanshi
(74) *Attorney, Agent, or Firm*—Matthew B. Talpis

(57) ABSTRACT

The present invention provides for reducing current spikes in a circuit when changing clocking frequencies. A first frequency is applied to a clock distribution network. A final frequency is selected. The first frequency is applied to a logic element over the clock distribution network. A hold signal is applied to the logic element. The clock rate of the clock distribution network is changed from the first frequency to the final frequency. The hold signal is unapplied to the logic element.

5 Claims, 4 Drawing Sheets

|  | STEP 1 | STEP 2 | STEP 3 | STEP 4 | STEP 5 |
|---|---|---|---|---|---|
| AC | 5.0 | 2.5 | 12.5 | 25.0 | 50.0 |
| CLOCK DISTRIBUTION | 2.0 | 2.0 | 10.0 | 20.0 | 20.0 |
| DC | 30.0 | 30.0 | 30.0 | 30.0 | 30.0 |
| TOTAL | 37.0 | 34.5 | 52.5 | 75.0 | 100.0 |

*FIG. 6*

DYNAMIC FREQUENCY SCALING SEQUENCE FOR MULTI-GIGAHERTZ MICROPROCESSORS

CROSS-REFERENCE TO RELATED APPLICATIONS

This application is a continuation of, and claims the benefit of the filing date of, U.S. patent application Ser. No. 10/937,689 entitled "Dynamic Frequency Scaling Sequence for Multi-Gigahertz Microprocessors", filed Sep. 9, 2004 now U.S. Pat. No. 7,516,350.

TECHNICAL FIELD

The present invention relates generally to frequency scaling and, more particularly, to frequency scaling in microprocessor circuits.

BACKGROUND

Power dissipation by a processor can raise various problems. The frequency of chip processing, the system clock of the chip, has increased over time. Presently, chips can run at 3 GHZ, 5 GHZ or more. This can lead to significant power consumption, and hence heat generation. It would be useful to be able to selectively and dynamically decrease processing speed to decrease power consumption and increase, say, battery life. Also, due to the increase of transistors and frequency of the chip, current spikes when switching from one processing speed to another processing speed can be a significant problem, especially when the switching is done quickly. Furthermore, when switching to a faster frequency from a slower frequency, the fast change of switching frequencies can cause voltage rails to fluctuate, which can create errors in the circuit.

In conventional technologies, there are various ways to change to a slower processing speed for a processor. One such way to change frequencies on a processor is to disable the processor entirely, and then change the settings of the PLL (phase locked loop) that is being used to drive the processor. However, shutting down the processor is expensive in terms of performance. Furthermore, it is better if the change in processing speeds occurs dynamically, that is without having to disable the circuit.

Other conventional technologies, therefore, changed processing speeds without entirely disabling the processor. In some previous technologies, they switched from one processing speed to another processing speed without using any intervening processing speeds to mitigate the current charge effect.

However, recently chip processing speeds have continued to increase. Therefore, the current spikes have become more of a problem. This can be compensated by adding more capacitors to the processor, but this makes the chip more expensive.

Therefore, there is a need to change from a first processing speed to a second processing speed in a manner that addresses at least some of the concerns of conventional processing speed switching.

SUMMARY OF THE INVENTION

The present invention provides for reducing current spikes in a circuit when changing clocking frequencies. A first frequency is applied to a clock distribution network. A final frequency is selected. The first frequency is applied to a logic element over the clock distribution network. A hold signal is applied to the logic element. The clock rate of the clock distribution network is changed from the first frequency to the final frequency. The hold signal is unapplied to the logic element.

BRIEF DESCRIPTION OF THE DRAWINGS

For a more complete understanding of the present invention, and the advantages thereof, reference is now made to the following Detailed Description taken in conjunction with the accompanying drawings, in which:

FIG. 6 is a chart showing a reduction in di/dt (change in current over time) using the method of FIG. 1.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
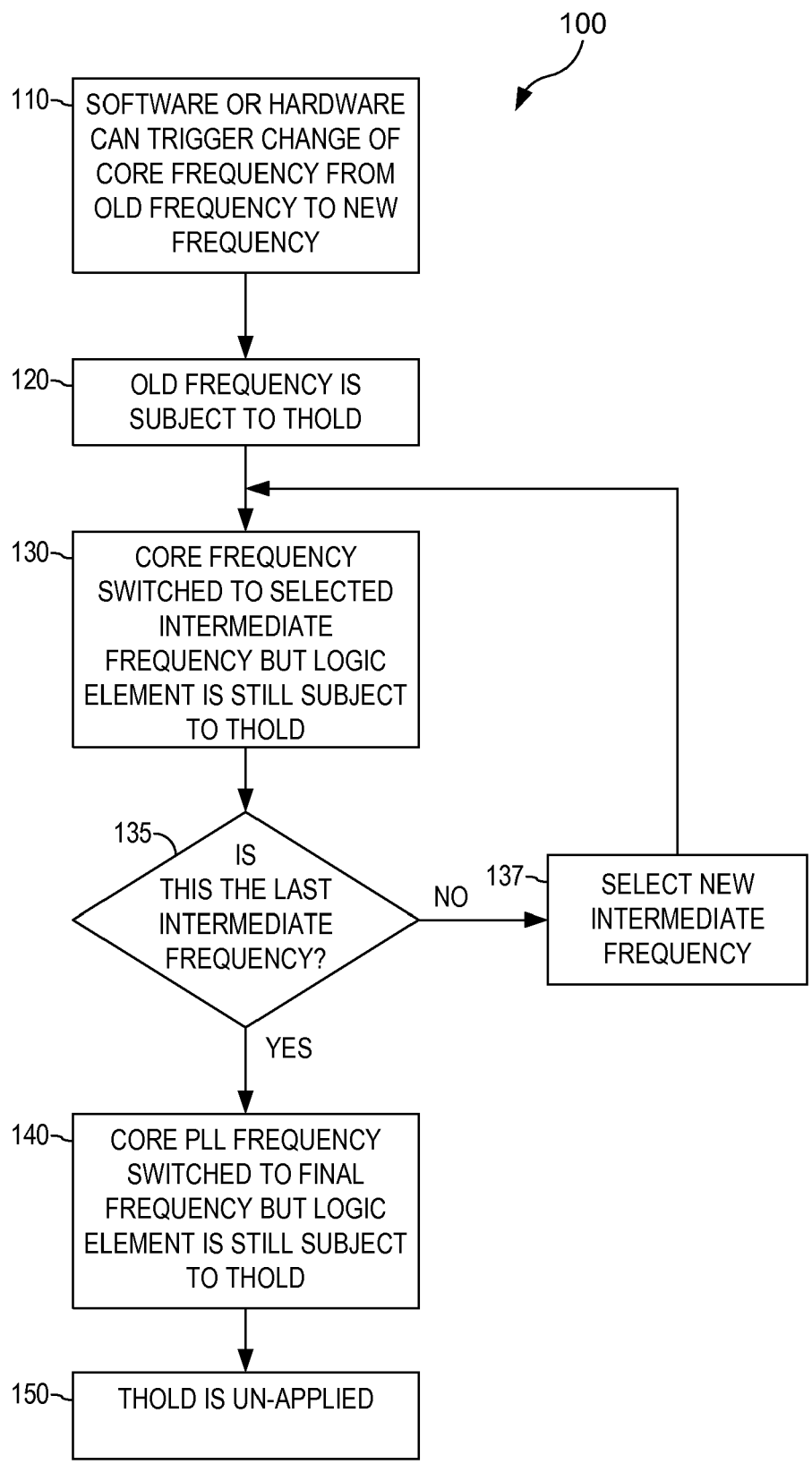
FIG. 1 schematically illustrates a method for selectively incrementing or decrementing clock speeds in a circuit.

Turning to FIG. 1, illustrated is a method flow chart 100 for selectively incrementing clock speeds in a circuit. Generally, the method 100 employs intermediate steps when changing from a higher frequency state to a lower frequency state. More specifically, the method 100 employs the concept of a "Thold". The Thold signal is coupled to a processing unit, as opposed to the entire clock distribution logic, and the processor only clocks when the value of Thold is high. If the value of Thold is low, then the processor does not increment. As the Thold value oscillates, the value Thold reduces the effective processing speed of the processor by half, whilst allowing the clock distribution network to stay at its original clocking speed as opposed to the Thold reduced clocking speed.

Generally, use of the Thold can have at least two specific advantages. A first advantage is that through the use of Thold, the use of more extensive and expensive intermediate circuitry to get at intermediate frequency states is avoided. Furthermore, changing the processing speed of the processor without changing the clocking speed of a clock distribution can decrease the current spike in the voltage rails when shifting from one clock speed to another clock speed.

Turning now to FIG. 1, illustrated is a method flow chart 100 for selectively incrementing clock speeds in a circuit. In step 110, software or hardware makes a determination that frequency scaling downward or upward is required, and this frequency is determined.

In step 120, Thold mode, which decreases the clock frequency of a processor by a value, such as ½, (for instance), is used to control a latch within the processor, thereby decreasing the speed of the processor. When Thold is signal is high, the latch will clock normally, and the clocking of the latch thereby does not reduce the clocking speed of the processor. However, when Thold is low (that is, when Thold is enabled), the old frequency is subject to a proportional reduction, and the processor runs at a lower rate, although the clock distribution logic switches at the old (un-Thold) frequency.

In step 130, frequency scaling control logic (FSCL), which is used to drive a clock circuit such as a PLL, switches to a pre-selected fixed frequency, such as the maximum frequency, which is the new speed of the clock distribution logic. The pre-selected frequency can be the final frequency or an intermediate frequency between the starting frequency and the ending frequency. However, with the enabled (that is, Thold equals low) mode, the clock speed of the processor is lower than that of the switching network. For instance, with the use of a "half" Thold mode, the clock frequency of the processor is effectively ½ of the pre-selected frequency, or ½ of the pre-selected frequency selected.

In step 135, it is determined whether this is the last intermediate frequency to be used by the PLL. If this is the last intermediate frequency, step 140 executes. If this is not the last intermediate frequency, in step 137, a new intermediate frequency is selected, and step 130 re-executes.

In step 140, the FSCL switches the PLL core clock frequency to the new desired frequency from the intermediate frequency. With the mode of the Thold logic 230 (FIG. 2) still active, such as on half-mode, the new effective clock frequency of the processor is the new frequency divided by 2. However, the clock distribution network is cycling at the frequency of the PLL final frequency.

In step 150, the control logic has the Thold logic on high, and therefore the logic 250 (FIG. 2) goes to full processing speed, that is the same processing speed as the clock distribution logic.

Figure 2:
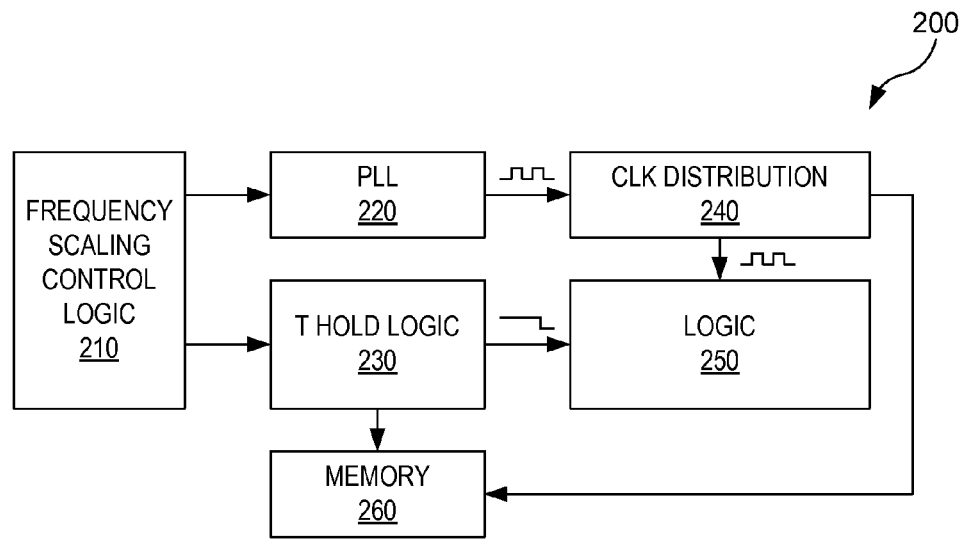
FIG. 2 illustrates a hardware environment for the method shown in FIG. 1.

Turning now to FIG. 2, illustrated is a functional interpretation of FIG. 1. A Frequency Scaling Control Logic 210 is coupled to a phase locked loop 220 (PLL) and a Thold logic 230. The PLL 220 is used as a clock for system 200. The PLL 220 is coupled to a clock distribution 240, which is used to drive the logic 250. The Thold logic is also coupled to the logic 250. Relating back to FIG. 1, the FSCL 210, in step 110, decides to change the processing speed of the logic 250. Therefore, in step 120, the FSCL 210 indicates to the Thold logic 230 to apply a "half hold" control signal to the logic 250, wherein the logic 250 then runs at a slower speed, such as half speed, due to the Thold input signal. A memory 260 is coupled to the Thold logic 230 and the clock distribution 240, and can be similarly affected by the Thold logic 230.

Next, the FSCL 210 switches the PLL 220 to an intermediate speed. The clock distribution 240 then runs at this new intermediate speed. The clock distribution 240 then applies this speed to the logic 250. However, the Thold logic 230 is still applying a signal to the logic 250. Therefore, the logic 250 is running at a fraction, such as half, of the intermediate frequency as input by the clock distribution logic 240 to the logic 250. The frequency of the logic 250 is effectively a proportion, such as half, of the intermediate frequency, or of the other intermediate clock frequency.

The FSCL 210 can then set the PLL 220 to the finally desired frequency, which is propagated through the clock distribution 240. The clock distribution logic 240 also inputs this frequency into the logic 250. However, the logic 250 is running at a lower mode due to the application of the Thold. In step 150, the FSCL 210 then commands the Thold logic 230 to be permanently outputting an enable signal, thereby allowing the logic 250 to run at the final, newly selected frequency value.

Figure 3:
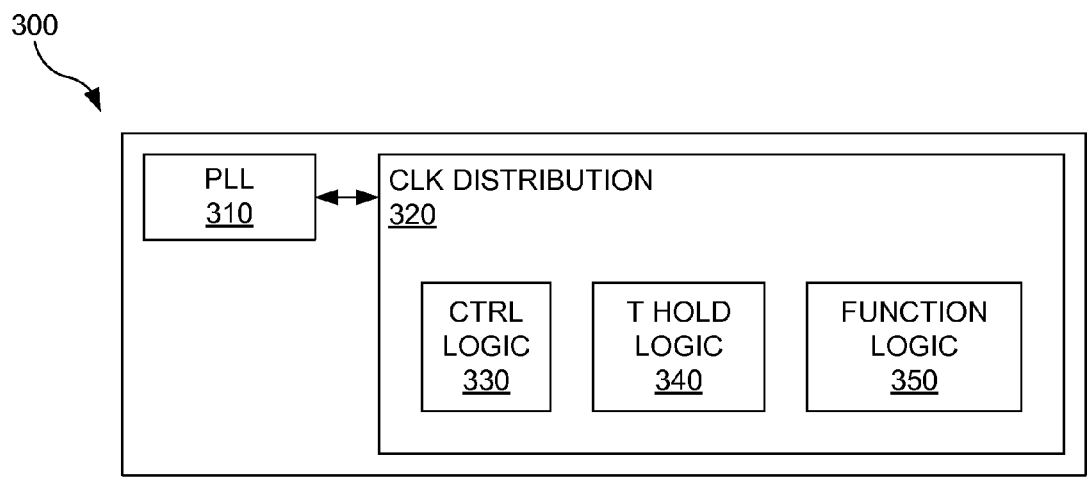
FIG. 3 is a block diagram of a chip in which frequency scaling can take place.

Turning now to FIG. 3, illustrated is a chip 300 in which frequency scaling can take place. A chip 300 has a separate PLL 310. A clock distribution 320 has Frequency Scaling Control logic 330, Thold Logic 340, and function logic 350.

Figure 4:
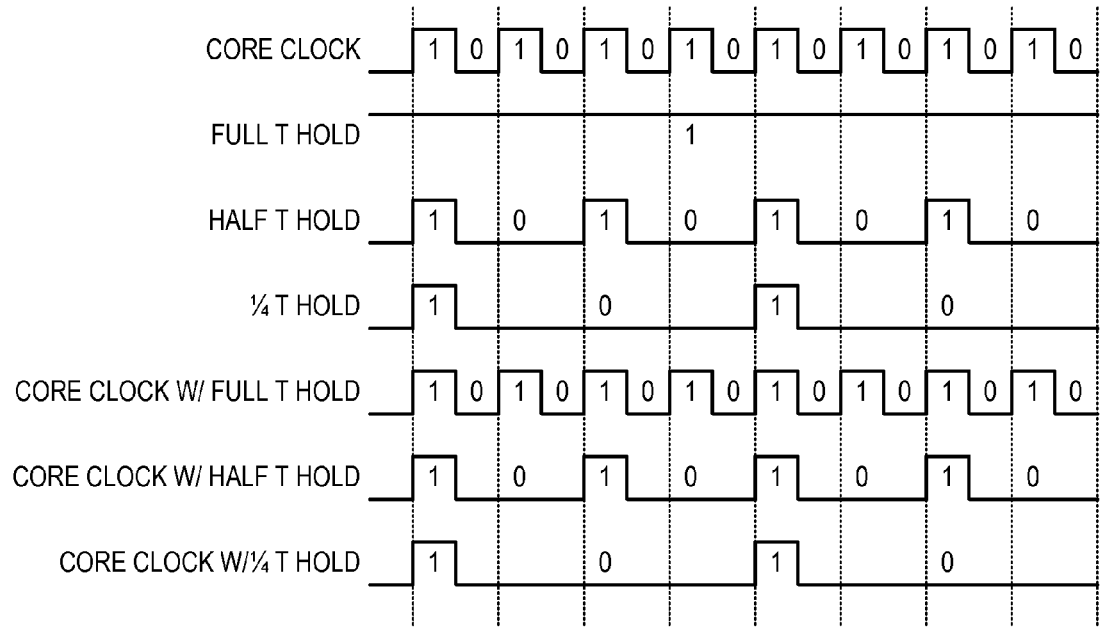
FIG. 4 is a timing diagram of a core clock operating at a first rate.

Turning now to FIG. 4, illustrated is an illustration of a full-frequency core clock (ie, the PLL 220 is running at its maximum allowable value). For the Full Thold situation, Thold is always one. Therefore, the logic 250 with full Thold is also running at the same speed as the speed it would be running at without being modified by the Thold.

When there is a half Thold, the core clock frequency of the PLL gets combined with a half Thold level, and the logic 250 frequency is running half-speed of the core clock speed. Finally, with a Thold of ¼, the processor with ¼ Thold runs at ¼ speed of what the PLL clock speed is.

Figure 5:
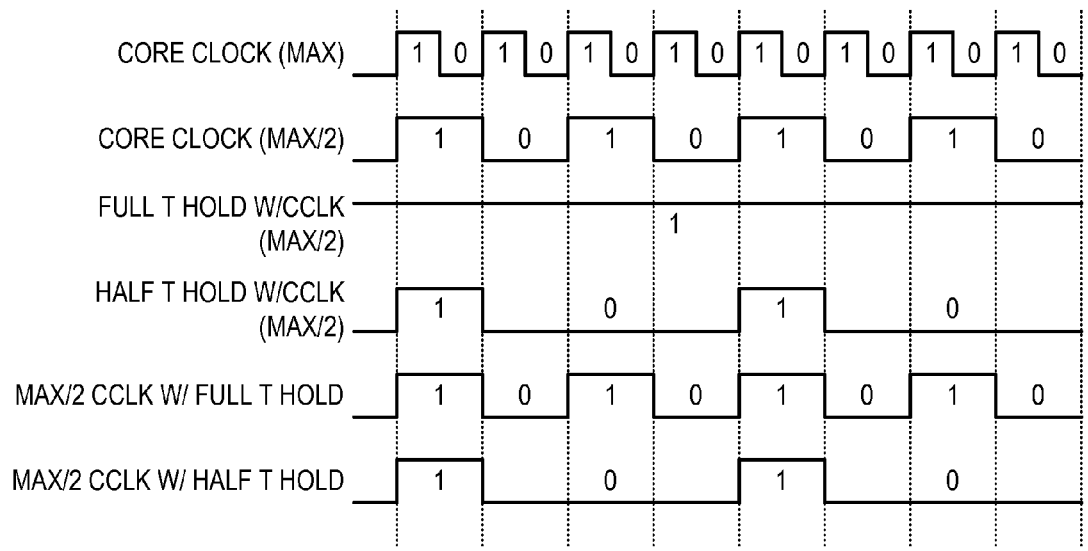
FIG. 5 is a timing diagram of a half-frequency core clock operating at a second rate.

Turning now to FIG. 5, the core clock speed has been changed from a maximum speed ("MAX") to a new speed, MAX/2 as requested by the FSCL 210, and implemented by the PLL 220 and conveyed by the clock distribution 240 to the logic 250. Illustrated is a full hold, Thold, for the Max/2 clock frequency, and the half hold, Thold, for the MAX/2 clock frequency. As is illustrated, the MAX/2 after having a full Thold applied has the same cyclic frequency as the MAX/2, without the full hold being applied. However, the MAX/2 with half Thold has an output half of MAX/2, which is ¼ of the speed of the original MAX clock.

Turning now to FIG. 6, illustrated is a showing of di/dt (change in current over time) reduction using the method of FIG. 1. This is one example, assuming chip total power is 100 Watts (step 5), of which 50% is AC (logic switching) power, 20% is Clock Distribution power, and 30% is DC (leakage, and IO) power. These percentages can be different in an actual design depending on the process technology, and implementation. Generally, the method 100 reduces the AC power consumption, but leaves the DC power consumption alone.

In this example, we are transitioning the chip to a ⅒ frequency mode. Without going thru the steps in the disclosed sequence of method 100, we are going directly from step 101 to step 150, which yields a current change of 63 W. With Step 120, 130, 140, the worst case change in current is 25 W, (from step 4, to step 5), or 60% reduction.

The transition time to go from one step to another depends on the clock frequency, and implementation. Typically, this is about 2 to 3 Max. frequency cycles, or about less than 1 nanosecond for a chip with a maximum frequency of 3 to 4 Ghz. This transition sequence does not reduce this transition time. But simply by increasing the number of steps, we can reduce di/dt by 75%. This helps to reduce the transmission line effect on the clock distribution.

By adding intermediate steps, the sequence enables the designer to put in delays in each step. With added delays at step 2, 3, and 4, we can dramatically increase the overall dt for the frequency scaling transition. This reduces the over all di/dt, mid- and low-frequency noise, and the amount of mid-frequency decoupling capacitance. For example, if we add in a delay of 100 ns in each intermediate step, we have an overall dt of 304 ns compared to 1 ns from before, or a reduction of over 99%. Note the actual reduction in di/dt observable by the package may not be as great depending on the actual mid- and low-frequency range. Because even though the transition without these steps is 1 ns, hardware (package and package decoupling capacitors) at mid-frequency is only sensitive to the mid-frequency, or time period of around tens of nanoseconds. (20~40 ns, maybe), so the actual dt reduction at mid-frequency is about 90%. The above transition is for a single flow of the method 100, but more intermediate steps could be added in a further embodiment.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A system for reducing current spikes in a circuit when changing clocking frequencies, comprising:
a frequency control logic;
a phase locked loop coupled to the control logic;
a clock distribution network coupled to the phase locked loop;
a hold logic coupled to the frequency control logic; and
a logic device coupled to clock distribution logic and the hold logic, wherein the hold logic is capable of applying a hold signal to the logic device, the hold signal causing the logic device to clock at a lower frequency than the clock distribution network.

2. The system of claim 1, further comprising a memory coupled to the hold logic and the clock distribution logic.

3. The system of claim 1, wherein the logic device is configured to clock at a slower speed when the hold is applied.

4. A computer program product for reducing current spikes in a circuit when changing clocking frequencies, the computer program product embodied on a computer-readable storage medium having computer-executable instructions for enabling a computer to perform predetermined operations, the computer program product comprising:
computer code for applying a first frequency to a clock distribution network;
computer code for selecting a final frequency;
computer code for applying the first frequency to a logic element over the clock distribution network;
computer code for applying a hold signal to the logic element for causing the logic element to run at a second frequency; wherein the second frequency is less than the first frequency;
computer code for changing a clock rate of the clock distribution network from the first frequency to the final frequency; and
computer code for unapplying the hold signal to the logic element.

5. A processor for reducing current spikes in a circuit when changing clocking frequencies, the processor including a computer program embodied on a computer-readable medium for storage having computer-executable instructions, the computer program comprising:
computer code for applying a first frequency to a clock distribution network;
computer code for selecting a final frequency;
computer code for applying the first frequency to a logic element over the clock distribution network;
computer code for applying a hold signal to the logic element for causing the logic element to run at a second frequency; wherein the second frequency is less than the first frequency;
computer code for changing a clock rate of the clock distribution network from the first frequency to the final frequency; and
computer code for unapplying the hold signal to the logic element.

* * * * *